United States Patent
De Lagrange et al.

(10) Patent No.: US 12,081,798 B2
(45) Date of Patent: Sep. 3, 2024

(54) SCALING PROCESS FOR JOINT CHROMA CODED BLOCKS

(71) Applicant: INTERDIGITAL CE PATENT HOLDINGS, SAS, Paris (FR)

(72) Inventors: Philippe De Lagrange, Betton (FR); Fabrice Leleannec, Betton (FR); Edouard Francois, Bourg des Comptes (FR); Philippe Bordes, Laille (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 58 days.

(21) Appl. No.: 17/782,226

(22) PCT Filed: Dec. 1, 2020

(86) PCT No.: PCT/EP2020/084021
§ 371 (c)(1),
(2) Date: Jun. 3, 2022

(87) PCT Pub. No.: WO2021/110628
PCT Pub. Date: Jun. 10, 2021

(65) Prior Publication Data
US 2023/0232045 A1  Jul. 20, 2023

(30) Foreign Application Priority Data
Dec. 6, 2019  (EP) .................................. 19306586

(51) Int. Cl.
*H04N 19/60* (2014.01)
*H04N 19/12* (2014.01)
*H04N 19/124* (2014.01)
*H04N 19/176* (2014.01)
*H04N 19/186* (2014.01)

(52) U.S. Cl.
CPC ............. *H04N 19/60* (2014.11); *H04N 19/12* (2014.11); *H04N 19/124* (2014.11); *H04N 19/176* (2014.11); *H04N 19/186* (2014.11)

(58) Field of Classification Search
CPC ...... H04N 19/60; H04N 19/12; H04N 19/124; H04N 19/176; H04N 19/186
See application file for complete search history.

(56) References Cited

FOREIGN PATENT DOCUMENTS

CN        114342395        4/2022

OTHER PUBLICATIONS

Fan et al., Non-CE3: JCCR and LMCS Interaction, 128. MPEG Meeting, Oct. 7, 2019-Oct. 11, 2019, Geneva, (Motion Picture Expert Group or ISO/IEC JTC1/SC29/WG11), No. m50350, Sep. 25, 2019, Document JVET-P383-V1.

(Continued)

*Primary Examiner* — Jae N Noh
(74) *Attorney, Agent, or Firm* — Ronald Kolczynski

(57) ABSTRACT

In a video bitstream, Cb and Cr channels are demultiplexed before dequantization instead of after inverse transformation. In this way, regular Cb and Cr quantization control parameters can be used, optionally with minor adjustments when a video block is joint-chroma coded. In one embodiment, some specific quantization control parameters can be specified. In another embodiment, separate Cb and Cr offsets can be specified for joint chroma coded blocks. In another embodiment, quantization control parameters specific to joint chroma coded blocks can be used for both Cb and Cr channels instead of nominal chroma quantization parameters.

14 Claims, 16 Drawing Sheets

(56) References Cited

OTHER PUBLICATIONS

Iwamura et al, "[AHG15] On Scaling List for JCCR", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P0608 Oct. 2, 2019 (Oct. 2, 2019).

De Lagrange et al., AHG15: Demultiplexing Joint CbCr Before Dequantization, 17, JVET Meeting, Jan. 7, 2020-Jan. 17, 2020, Brussels, (The Joint Video Exploration Team of ISO/IEC JTC/SC29/WG11 and ITU-T SG.16), No. JVET-Q0473, Jan. 6, 2020.

Lainema, CE7: Joint Coding of Chrominance Residuals (CE7-1), 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0054, Mar. 12, 2019.

Bross et al., "Versatile Video Coding (Draft 7)", Joint Video Experts Team (JVET) of ITU-T SG 16 WP 3 and ISO/IEC JTC 1/SC 29/WG 11, Document: JVET-P2001-vE, 16th Meeting: Geneva, Switzerland, Oct. 1, 2019.

SCALING PROCESS FOR JOINT CHROMA CODED BLOCKS

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for simplifications of coding modes based on neighboring samples dependent parametric models.

According to a first aspect, there is provided a method. The method comprises steps for demultiplexing Cb and Cr from a video block when joint Cb/Cr are coded for the video block; dequantizing the demultiplexed Cb and Cr data; inverse transforming the dequantized Cb and Cr data; and, decoding said video block using said inverse transformed Cb and Cr data.

According to a first aspect, there is provided a method. The method comprises steps for parsing a video bitstream and scaling Cb and Cr for a video block; dequantizing the demultiplexed Cb and Cr data; inverse transforming the dequantized Cb and Cr data; and, decoding said video block using said inverse transformed Cb and Cr data.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
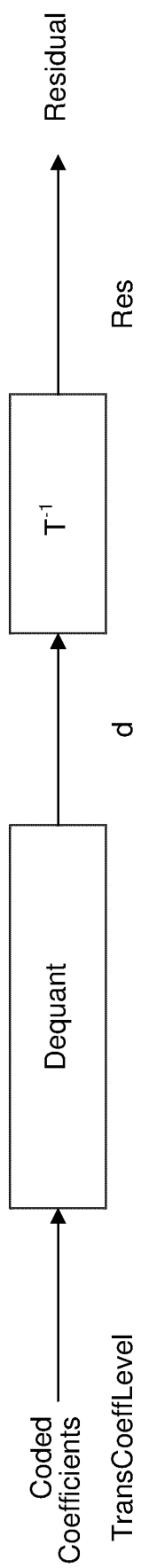
FIG. 1 shows a scaling and transformation functional diagram.

The embodiments described here are in the field of video compression and generally relate to video compression and video encoding and decoding more specifically the quantization step of the video compression scheme. The general aspects described aim to provide a mechanism to operate restrictions in high-level video coding syntax or in the video coding semantics to constrain the possible set of tools combinations.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, motion compensated temporal prediction is employed to exploit the redundancy that exists between successive pictures of a video.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU).

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to −135 degree over a 180 angle, and they have been maintained in JEM, which has made the definition of angular directions independent of the target block shape.

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples, which is required to cover the aforementioned angle range for all target pixels. Considering that the height and width of a PU are of equal length, the equality of lengths of two reference arrays also makes sense.

The invention is in the field of video compression. It aims at improving the bi-prediction in inter coded blocks compared to existing video compression systems. The present invention also proposes to separate luma and chroma coding trees for inter slices.

Figure 14:
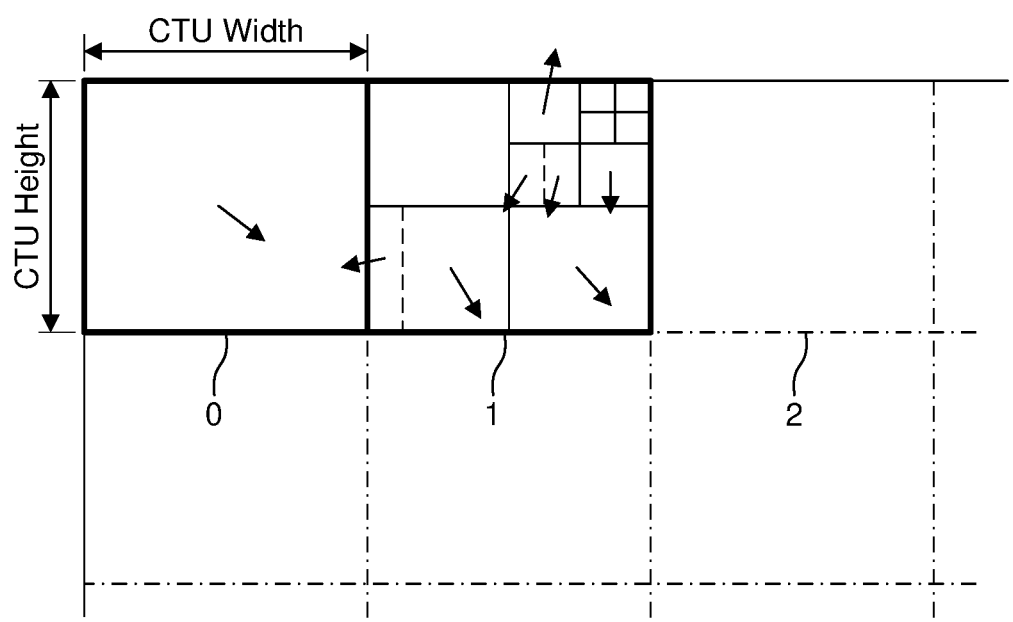
FIG. 14 shows Coding Tree Unit and Coding Tree concepts to represent a compressed HEVC picture.

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU), see FIG. 14.

Figure 15:
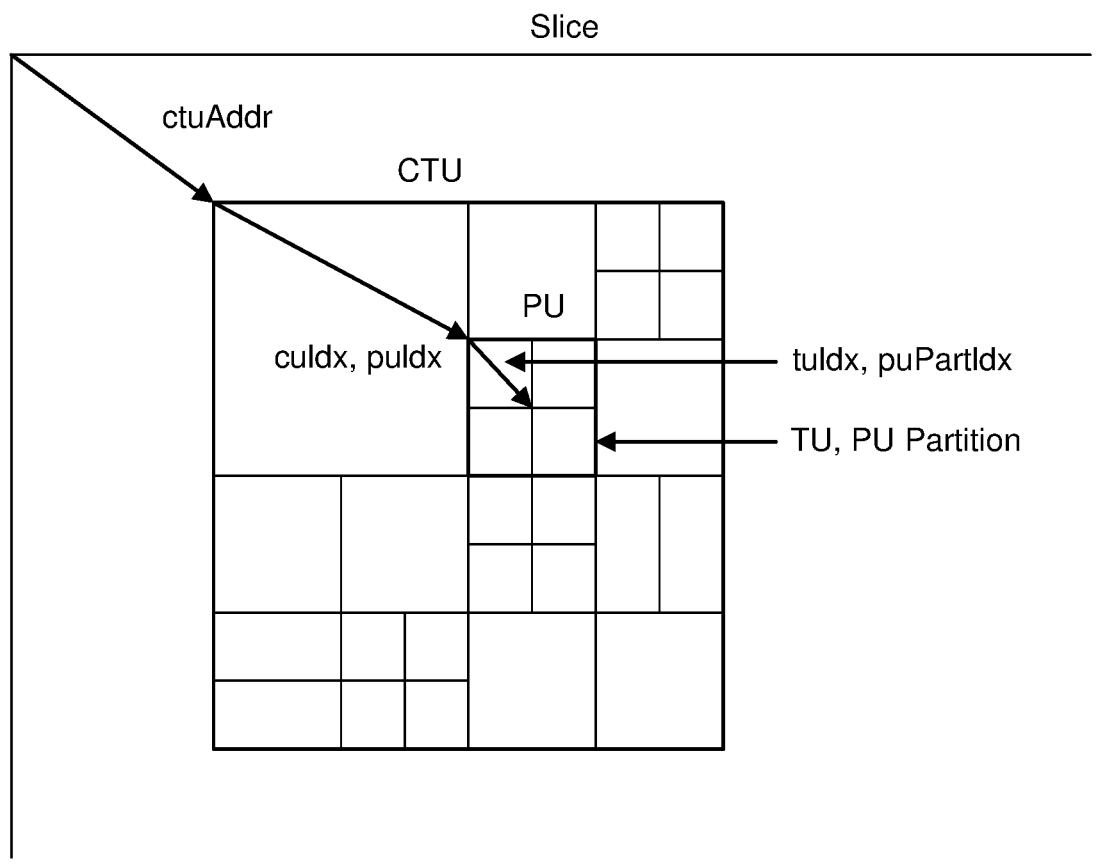
FIG. 15 shows an example division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 15.

New emerging video compression tools include a Coding Tree Unit representation in the compressed domain is proposed, in order to represent picture data in a more flexible way in the compressed domain. The advantage of this more flexible representation of the coding tree is that it provides increased compression efficiency compared to the CU/PU/TU arrangement of the HEVC standard.

Figure 16:
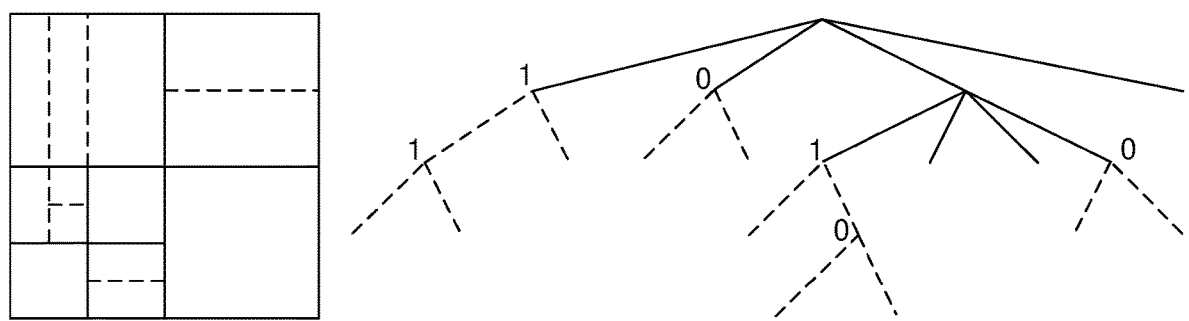
FIG. 16 shows an example Quad-Tree Plus Binary-Tree (QTBT) CTU representation.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated on FIG. 16.

The splitting of a coding unit is decided on the encoder side through a rate distortion optimization procedure, which consists is determine the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divide in a binary fashion. This is illustrated on the right of FIG. 16 where solid lines represent the quad-tree decomposition phase and dashed lines represent the binary decomposition that is spatially embedded in the quad-tree leaves.

The general aspects described herein are in the field of video compression. A video codec is made of a combination of multiple coding tools. The common practice is to standardize the decoder side (syntax and decoding process).

A general functional diagram of scaling (or dequantization) and transformation process in a current coding scheme (such as VVC draft 6, for example) is illustrated in FIG. 1, where coded coefficients of a given transform block (TransCoeffLevel) go through dequantization (Dequant) giving scaled transformed coefficients (d), then inverse transform ($T^{-1}$), resulting in the residual samples for that block (res).

Figure 2:
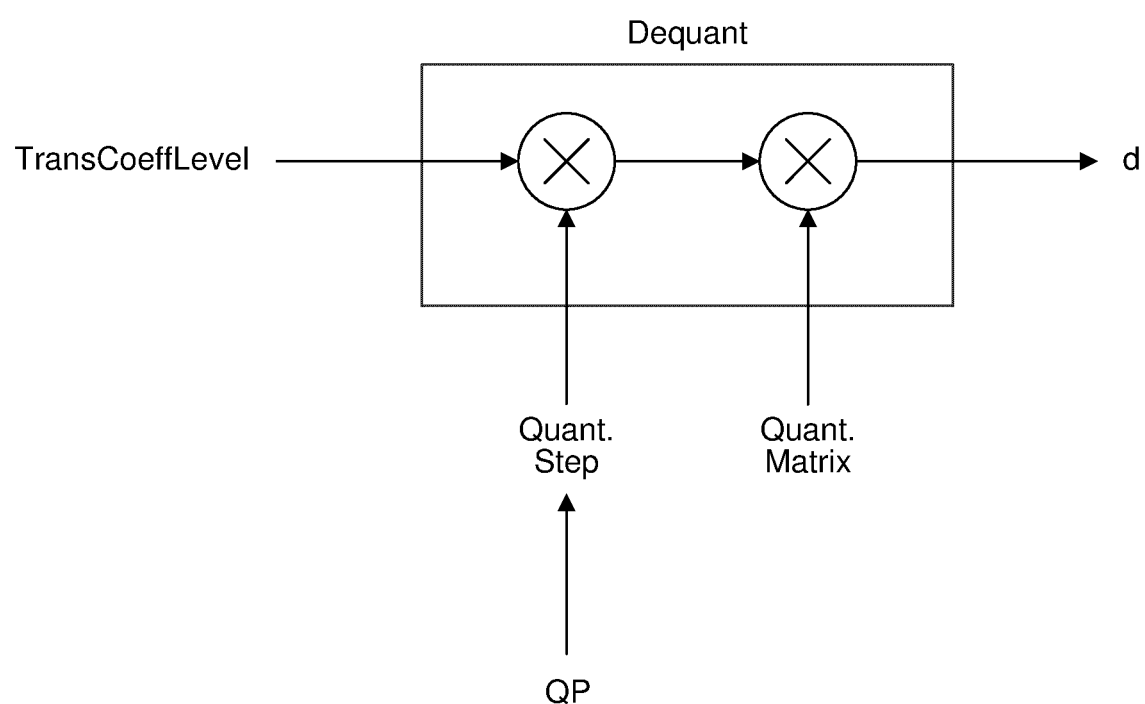
FIG. 2 shows a dequantization functional diagram.

The dequantization part is illustrated in FIG. 2.

As in HEVC, the scaling (or dequantization) process of VVC consists in scaling the transformed coefficients by a quantization step qStep and a quantization matrix m[ ][ ], resulting in dequantized coefficients d[ ][ ]. This is detailed in the following equation (ignoring the dependent quantization feature and other minor variants for the sake of simplicity):

$$d[x][y] = \text{Clip3}(\text{coeffMin}, \text{coeffMax}, ((\text{TransCoeffLevel} [xTbY][yTbY][cIdx][x][y] * m[x][y] * \text{levelScale}[qP \% 6] << (qP/6)) + (1 << (\text{bdShift}-1))) >> \text{bdShift})$$

Where:
- TransCoeffLevel[ . . . ] are the transformed coefficients absolute values for the current block identified by its spatial coordinates xTbY, yTbY and its component index cIdx.
- x and y are the horizontal/vertical frequency indices.
- qP is the current quantization parameter.
- the multiplication by levelScale[qP %6] and left shift by (qP/6) is the equivalent of the multiplication by quantization step qStep=(levelScale[qP %6]<<(qP/6))
- m[ . . . ][ . . . ] is the two-dimensional quantization matrix
- bdShift is an additional scaling factor to account for image sample bit depth. The term (1<<(bdShift−1)) serves the purpose of rounding to the nearest integer.
- d[ . . . ] are the resulting dequantized transformed coefficients absolute values Quantization control is the combination of syntax used to control the QP and quantization matrix for a specific coded block.
- Quantization parameter (QP) depends on various offsets that can be specified at PPS, picture, slice, or CU level, depending on color component.

Figure 3:
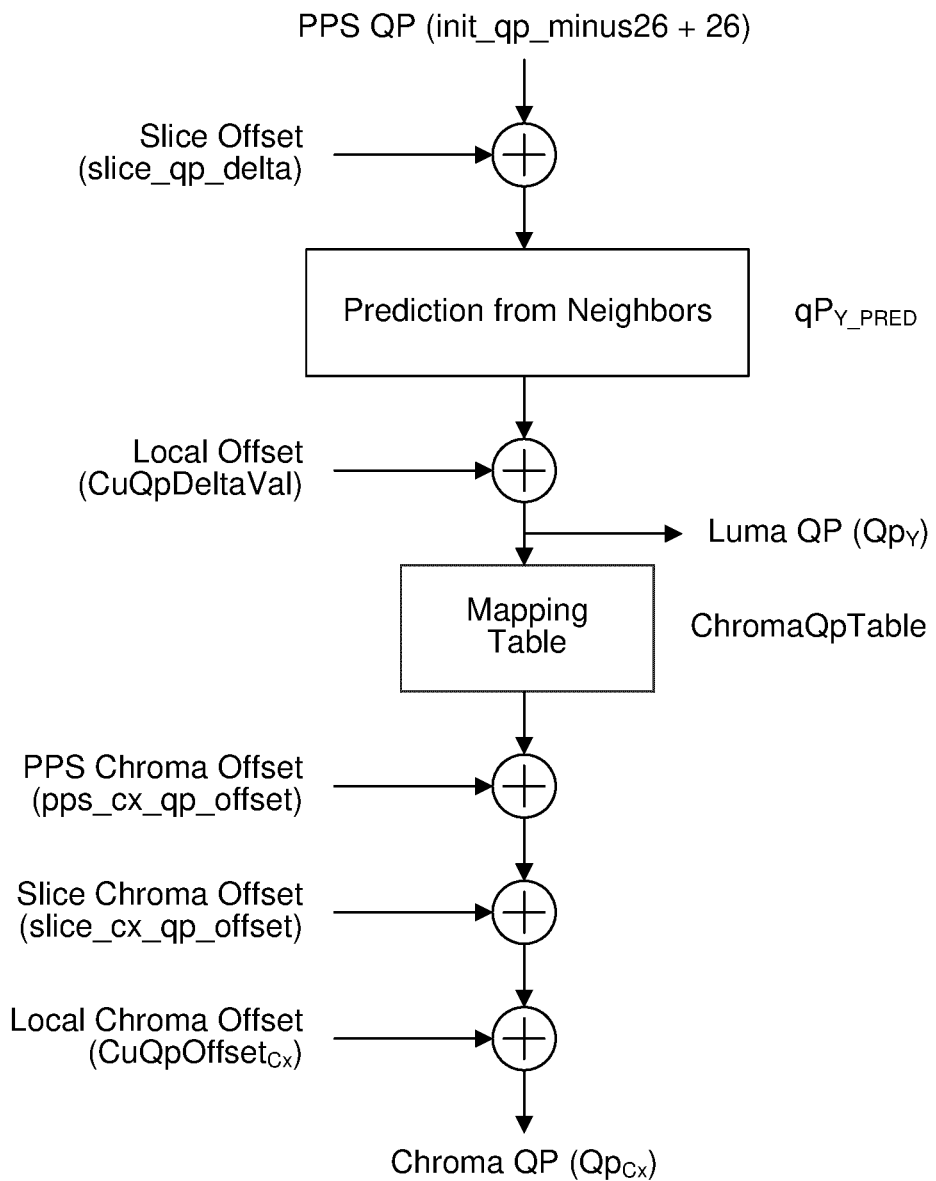
FIG. 3 shows a quantization parameter derivation functional diagram.

QP derivation is illustrated by the functional diagram in FIG. 3, equation (1) for luma and equation (2) for chroma, where the 'x' of Cx means the current chroma channel.

$$Qp_Y = qP_{Y\_PRED} + \text{CuQpDeltaVal}, \quad (1)$$

with $qP_{Y\_PRED}$ initially set to SliceQpY, and SliceQpY=26+init_qp_minus26+slice_qp_delta.
$qP_{Y\_PRED}$ is then shared by a group of CUs called Quantization Group (QG). $qP_{Y\_PRED}$ is derived as the average of the QPs of the left and top neighboring blocks ($qP_{Y\_A}$ and $qP_{Y\_B}$) on the top-left corner of the current quantization group:

$$qP_{Y\_PRED} = (qP_{Y\_A} + qP_{Y\_B} + 1) >> 1$$

CuQpDeltaVal can be specified once per QG, as soon as a transform block has non-zero coefficients.

$$Qp_{C_x} = \text{ChromaQpTable}[x][Qp_Y] + qP_{C_x} + pps\_cx\_qp\_\text{offset} + \text{slice}\_cx\_qp\_\text{offset} + \text{CuQpOffset}_{C_x} \quad (2)$$

A set of quantization matrices is transmitted in an "Adaptation Parameter Set" which can be referred to in a given slice. Based on block prediction mode (intra, inter, IBC), color component (Y, Cb, Cr), and block size, an identifier is used to select a quantization matrix from the set, as illustrated in Table 1 which specifies the identifier of the selected matrix based on block properties. The selected quantization matrix is then resized to match the block size.

TABLE 1

Quantization matrix identifier according to block properties

| max (block width, block height) | | 2 | 4 | 8 | 16 | 32 | 64 |
|---|---|---|---|---|---|---|---|
| INTRA | Y | | 2 | 8 | 14 | 20 | 26 |
| | Cb | | 3 | 9 | 15 | 21 | 21 |
| | Cr | | 4 | 10 | 16 | 22 | 22 |
| INTER, IBC | Y | | 5 | 11 | 17 | 23 | 27 |
| | Cb | 0 | 6 | 12 | 18 | 24 | 24 |
| | Cr | 1 | 7 | 13 | 19 | 25 | 25 |
| Size of selected quantization matrix | | 2 × 2 | 4 × 4 | 8 × 8 | 8 × 8 + DC | | |

A current coding scheme (VVC draft 6) describes a joint chroma coded residual feature, where a single chroma channel is coded, and Cb/Cr chroma channels are reconstructed by sign change (based on a slice-level flag) and/or ½ scale depending on joint chroma mode (TuCResMode), which is derived from the chroma transform blocks coded block flags tu_cbf_cb and tu_cbf_cr, as illustrated in Table 2:

TABLE 2

Joint chroma coded modes in VVC draft 6

| tu_cbf_cb | tu_cbr_cr | Reconstruction of Cb and Cr residuals | TuCResMode | Quant. matrix |
|---|---|---|---|---|
| 1 | 0 | resCb[x][y] = resJointC[x][y]<br>resCr[x][y] = (CSign * resJointC[x][y]) >> 1 | 1 | Cb |
| 1 | 1 | resCb[x][y] = resJointC[x][y]<br>resCr[x][y] = CSign * resJointC[x][y] | 2 | Cb |
| 0 | 1 | resCb[x][y] = (CSign * resJointC[x][y]) >> 1<br>resCr[x][y] = resJointC[x][y] | 3 | Cr |

The CSign variable of Table 2 is derived as (1−2*pic_joint_cbcr_sign_flag), where pic_joint_cbcr_sign_flag is a syntax element decoded at the picture level.

Figure 4:
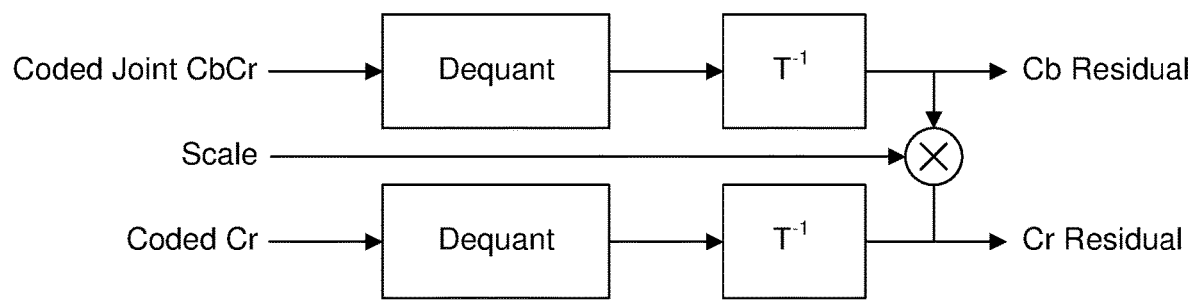
FIG. 4 shows a scaling and transformation functional diagram for joint chroma coding.

The scaling and transformation process is adapted as illustrated in FIG. 4 (and as specified in section 8.7.2 pp. 282-283 of VVC draft 6, for example), where the single coded chroma block is dequantized, then inverse transformed, then split into Cb and Cr channels (called demultiplexing in the rest of this document). The "scale" factor is either −1, −½, +½ or +1 depending on CSign and TuCResMode, as detailed in Table 2. The grayed-out part, normally for the secondary chroma channel, is not used in this case. Coded channel and Cb and Cr residuals can be swapped depending on joint chroma mode, which is not shown in FIG. 4 for the sake of simplicity, but detailed in Table 2.

Figure 5:
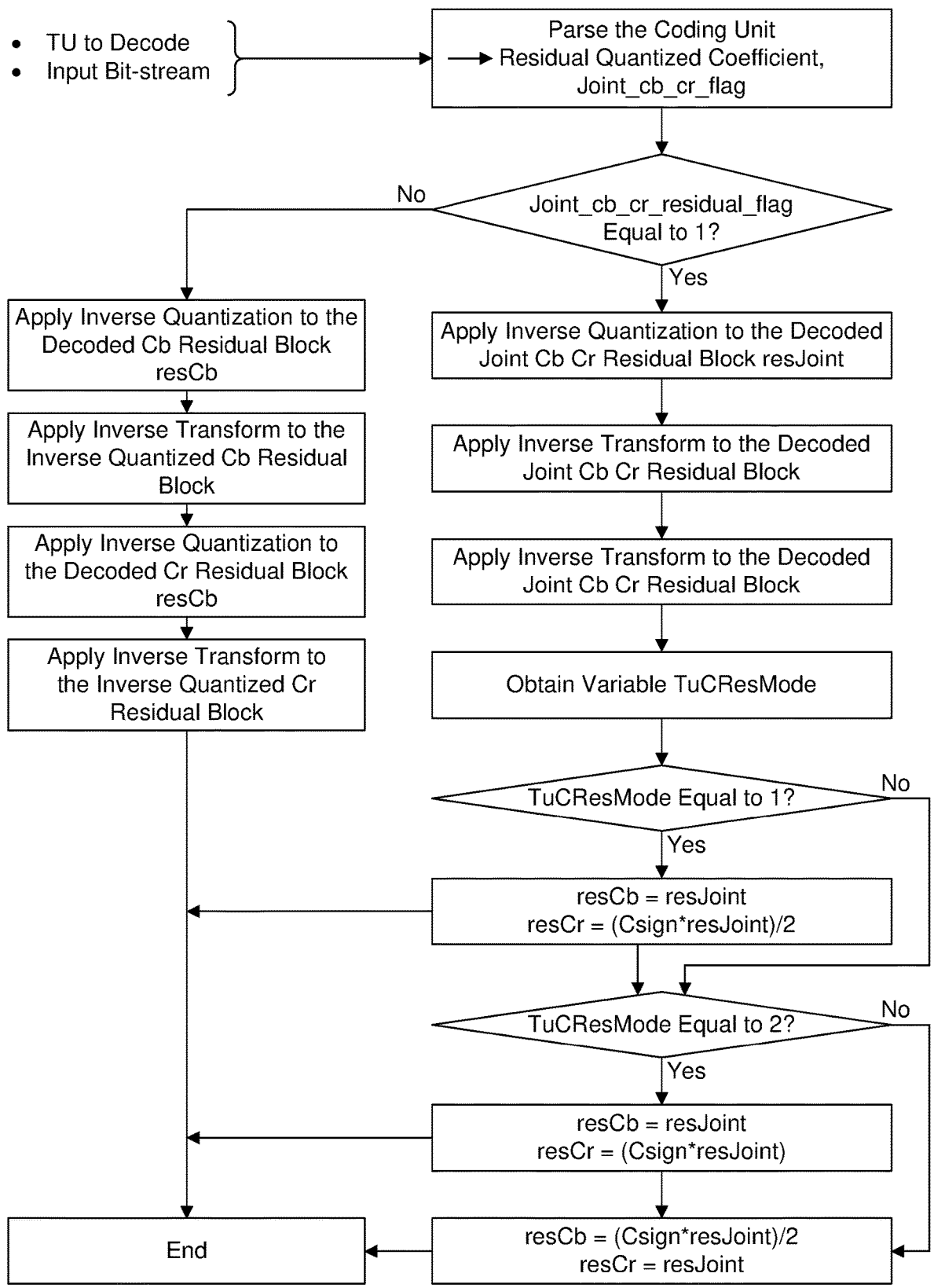
FIG. 5 shows a residual block decoding process of a current coding scheme.
Figure 6:
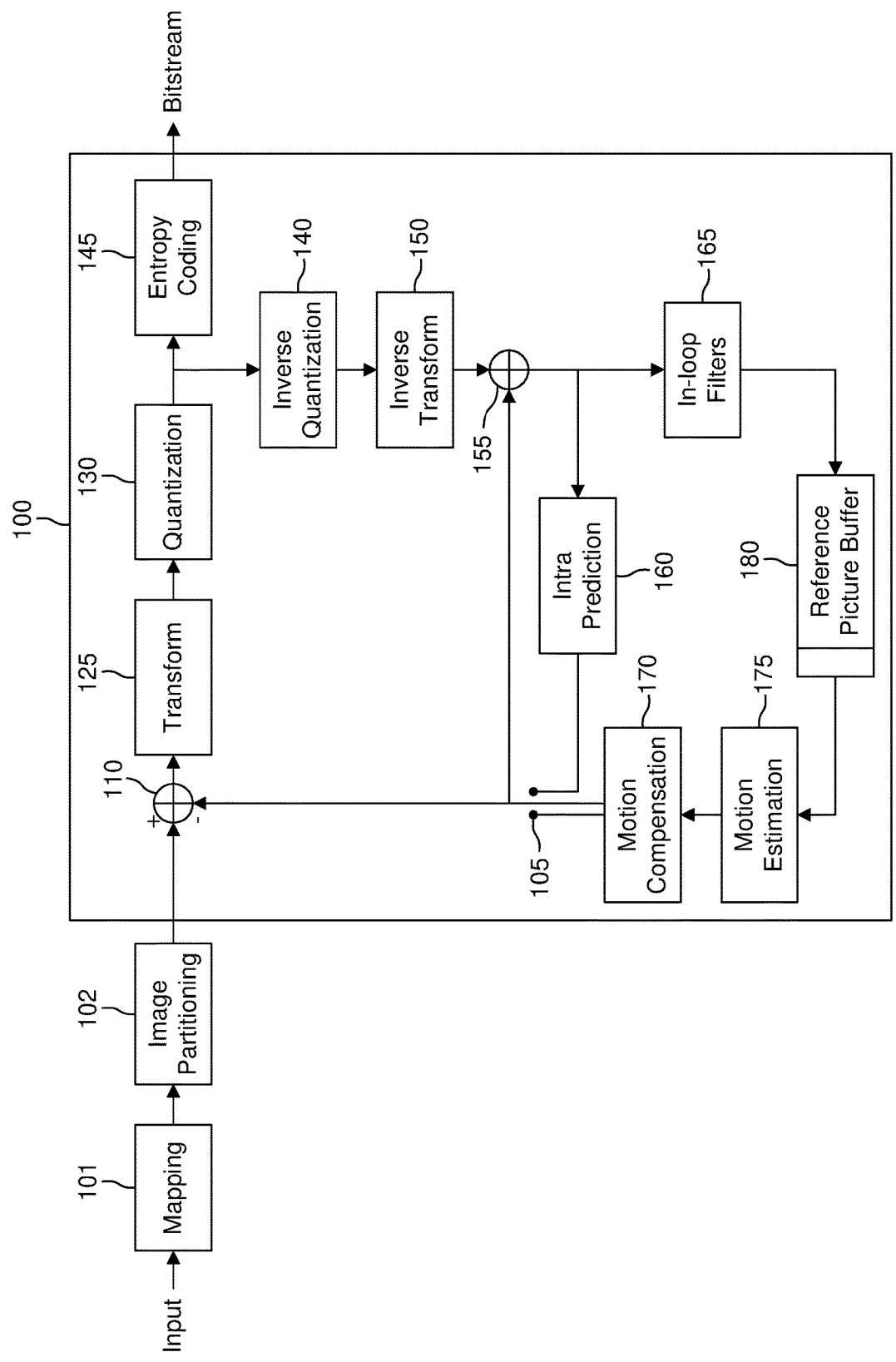
FIG. 6 shows a standard, generic video compression scheme.
Figure 7:
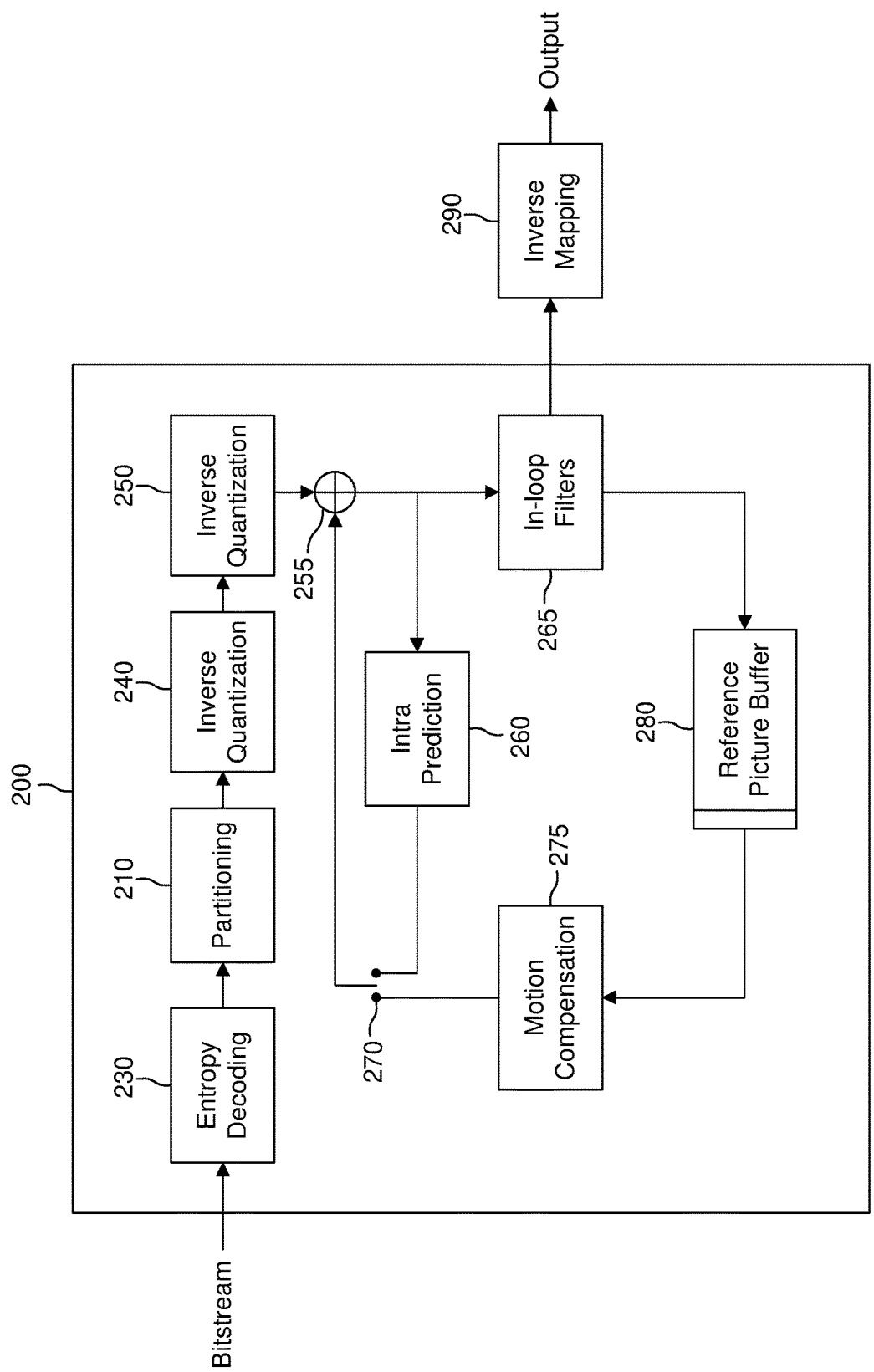
FIG. 7 shows a standard, generic video decompression scheme.

FIG. 5 shows the residual block decoding process as specified in a current coding scheme. The input to this process is a transform unit (TU) to decode, and the input bit-stream to parse.
- The first step consists in parsing the coded data associated to the considered CU. In particular, this provides the parsed quantized transform coefficient contained in the residual block of the considered CU, and also the joint_cb_cr_flag syntax element, which indicates the use of joint Cb/Cr residual coding for the considered TU.
- Next, if the joint_cb_cr_flag is false, then the usual inverse quantization and inverse transform steps follow, successively and separately for Cb and Cr transform blocks.

In the opposite case:
- a single inverse quantization step is applied on the joint Cb/Cr residual signal.
- Moreover, a single inverse transform applies on the inverse quantized joint Cb/Cr residual data. This leads to a joint Cb/Cr residual signal decoded in the spatial domain.
- The decoded Cb and Cr are then computed from the spatial domain decoded joint Cb/Cr residual block. This process depends on the TuCResMode variable associated to the TU and on the CSign variable derived on the picture level. The demultiplexing of Cb and Cr follows the specification of Table 2.
- The VVC draft specifies extra quantization control parameters for joint chroma mode (chroma QP offsets, QP mapping table, etc) in addition to Cb and Cr ones. An example in slice header syntax structure is illustrated below:

| | Descriptor |
|---|---|
| slice_header( ) { | |
| [...] | |
| if( pps_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| [...] | |
| } | |

The embodiments presented here propose to move demultiplexing of Cb and Cr residuals from after transform to before dequantization, so that regular separate Cb and Cr chroma quantization control parameters (QP offsets, quantization matrices) can be used, without the need for specific joint-CbCr quantization control parameters.

As said above, a current coding scheme (VVC draft 6) includes specific quantization control parameters for joint chroma mode, but not for all parameters: there are no specific quantization matrices (Cb or Cr quantization matrix is selected as shown in Table 2). The problem to be solved is to make quantization control consistent for all chroma coding modes, either joint or not, while possibly removing joint chroma coding mode-specific quantization control parameters. This is expected to result in a simpler coding scheme and less coded bits.

A prior proposal ([JVET-P0608]) proposed to add joint-chroma-coding-specific quantization matrices when the joint chroma mode is equal to 2 (see TuCResMode in Table 2), with the table modified as follows:

TABLE 7-6

Specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 1, 2, 3, 4, 5, 6 | MODE_INTRA | 1 (Cb when TuCResMode is 2) | 3 |
| 2, 3, 4, 5, 6 | MODE_INTER, MODE_IBC | 0 (Y) | 4 |
| 1, 2, 3, 4, 5, 6 | MODE_INTER, MODE_IBC | 1 (Cb) | 5 |
| 1, 2, 3, 4, 5, 6 | MODE_INTER, MODE_IBC | 2 (Cr) | 6 |

TABLE 7-6-continued

Specification of matrixId according to sizeId, prediction mode and colour component

| sizeId | CuPredMode | cIdx (Colour component) | matrixId |
|---|---|---|---|
| 1, 2, 3, 4, 5, 6 | MODE_INTER, MODE_IBC | 1 (Cb when TuCResMode is 2) | 7 |

This has the drawback of adding more bits to the scaling_list_data syntax used to transmit custom quantization matrices. A second option proposed in JVET-P0608 that avoids transmitting extra quantization matrices, but still using specific ones for joint chroma coded blocks is to use an average of Cb and Cr quantization matrices.

In the current aspects described herein, Cb and Cr channels are demultiplexed before dequantization instead of after inverse transform. This way, regular Cb and Cr quantization control parameters can be used, optionally with minor adjustments when the current block is joint-chroma coded (e.g. a general QP offset).

Figure 8:
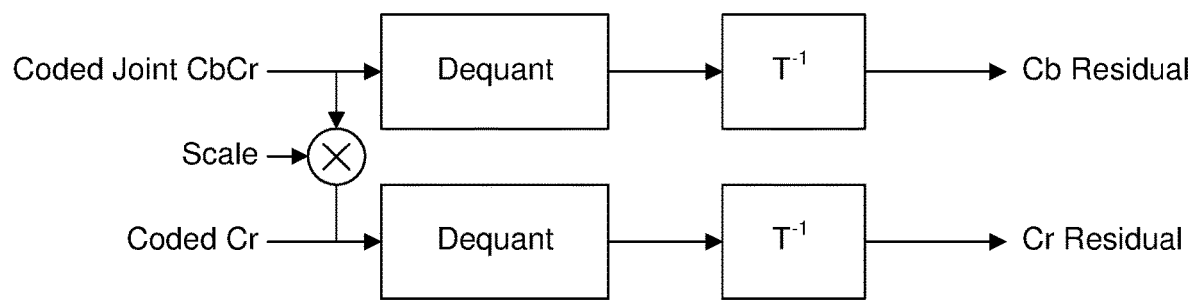
FIG. 8 shows a scaling and transformation functional diagram for joint chroma coding under the described aspects.

In the current disclosure, Cb and Cr channels are reconstructed before dequantization instead of after inverse transform, as illustrated in FIG. 8.

Figure 9:
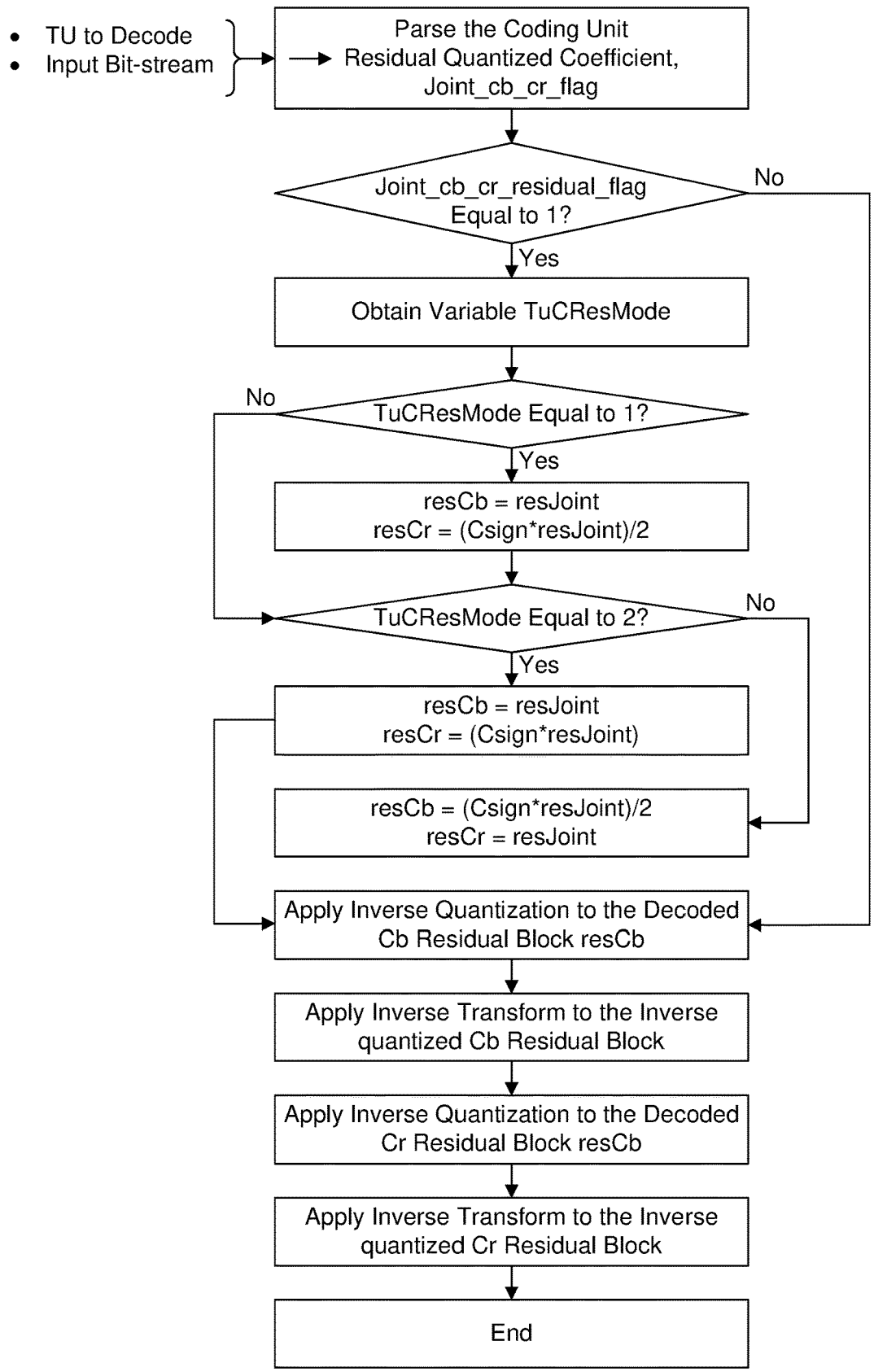
FIG. 9 shows a proposed residual block decoding process.

The algorithm of FIG. 9 depicts the residual block decoding process according to the proposed embodiment. The process of FIG. 9 is a modified version of the decoding process of a residual block of FIG. 5, according to the main embodiment of the proposed invention. As can be seen, the ordering of operations is changed compared to FIG. 5. The separate Cb and Cr residuals are now obtained in the quantized transform domain rather than in the spatial domain as is the case in VVC draft 6.

Thus, the demultiplexing of the joint Cb/Cr quantized residual is performed first, in case the TU-level joint_cb_cr_residual_flag is true. Next, the usual inverse quantization and inverse transform are applied separately on the obtained Cb and Cr residual blocks, exactly in the same way as for transform units not coded in joint Cb/Cr mode.

This way, exactly the same de-quantization is used for blocks coded in joint Cb/Cr mode and other blocks. In particular, thanks to the modified decoding process proposed, the same quantization matrices can be used for blocks coded in joint Cb/Cr mode and other blocks, making the overall quantization control easier and cleaner.

Note the re-ordering of decoding steps proposed is theoretically possible because the Cb/Cr de-multiplexing consists in pixel-wise linear operations, which can be easily permuted with the de-quantization and inverse transform.

Below is an example of draft text to implement the proposed scheme:
[ . . . ]
The variable codedCIdx is derived as follows:
  If cIdx is equal to 0 or TuCResMode[xTbY][yTbY] is equal to 0, codedCIdx is set equal to cIdx.
  Otherwise, if TuCResMode[xTbY][yTbY] is equal to 1 or 2, codedCIdx is set equal to 1.
  Otherwise, codedCIdx is set equal to 2.
The variable cSign is set equal to (1−2*slice_joint_cbcr_sign_flag).
The (nTbW)×(nTbH) array of residual samples resSamples is derived as follows:
  1. When cIdx is different from codedCIdx, the transform coefficient levels TransCoeffLevel[xTbY][yTbY][cIdx][x][y] with x=0 . . . nTbW−1, y=0 . . . nTbH−1 are derived as follows:

If TuCResMode[xTbY][yTbY] is equal to 2, the following applies:

TransCoeffLevel[xTbY][yTbY][cIdx][x][y]=
 cSign*TransCoeffLevel[xTbY][yTbY][coded-
 CIdx][x][y]    (1125)

Otherwise, the following applies:

TransCoeffLevel[xTbY][yTbY][cIdx][x][y]=
 (cSign*TransCoeffLevel[xTbY][yTbY][coded-
 CIdx][x][y])>>1    (1126)

2. The scaling process for transform coefficients as specified in clause 8.7.3 is invoked with the transform block location (xTbY, yTbY), the transform block width nTbW and the transform block height nTbH, the prediction mode predMode, and the colour component variable cIdx being set equal to codedCIdx as inputs, and the output is an (nTbW)×(nTbH) array of scaled transform coefficients d.
3. The (nTbW)×(nTbH) array of residual samples res is derived as follows:
   If transform_skip_flag[xTbY][yTbY][codedCIdx] is equal to 1, the residual sample array values res[x][y] with x=0 . . . nTbW−1, y=0 . . . nTbH−1 are derived as follows:

res[x][y]=d[x][y]    (1127)

Otherwise (transform_skip_flag[xTbY][yTbY][codedCIdx] is equal to 0 or and cIdx is not equal to 0), the transformation process for scaled transform coefficients as specified in clause 8.7.4.1 is invoked with the transform block location (xTbY, yTbY), the transform block width nTbW and the transform block height nTbH, the colour component variable cIdx being set equal to codedCIdx and the (nTbW)×(nTbH) array of scaled transform coefficients d as inputs, and the output is an (nTbW)×(nTbH) array of residual samples res.

See also chroma QP control syntax and semantics, and chroma QP derivation in § 8.7.1 of VVC draft.
Variants include moving the right shift of (1126) to:
  dequantized domain, either subtracting 6 to QP, or adding one to bdShift within § 8.7.3 (equation 1135)
  or inverse transform domain, by adding 1 to bdShift within § 8.7.4.1 (equation 1166) (preferred option)

In one variant, for joint chroma coded blocks, some specific quantization control parameters can be specified, e.g. the QP offset currently defined in VVC draft, like pps_joint_cbcr_qp_offset and/or slice_joint_cbcr_qp_offset, could still be used (either directly for Cb and Cr, or preferably on top of regular Cb and Cr QP offsets). This can be justified by specific properties of joint chroma coded blocks, like different scaling norm, or different visual quality.
In a further variant, separate Cb/Cr offsets could be specified for joint chroma coded blocks.

In another variant, quantization control parameters specific to joint chroma coded blocks (PPS and slice-level offset, chroma QP mapping table, etc) as defined by VVC draft 6 could still be used for both Cb and Cr channels instead of regular chroma QPs.

Figure 11:
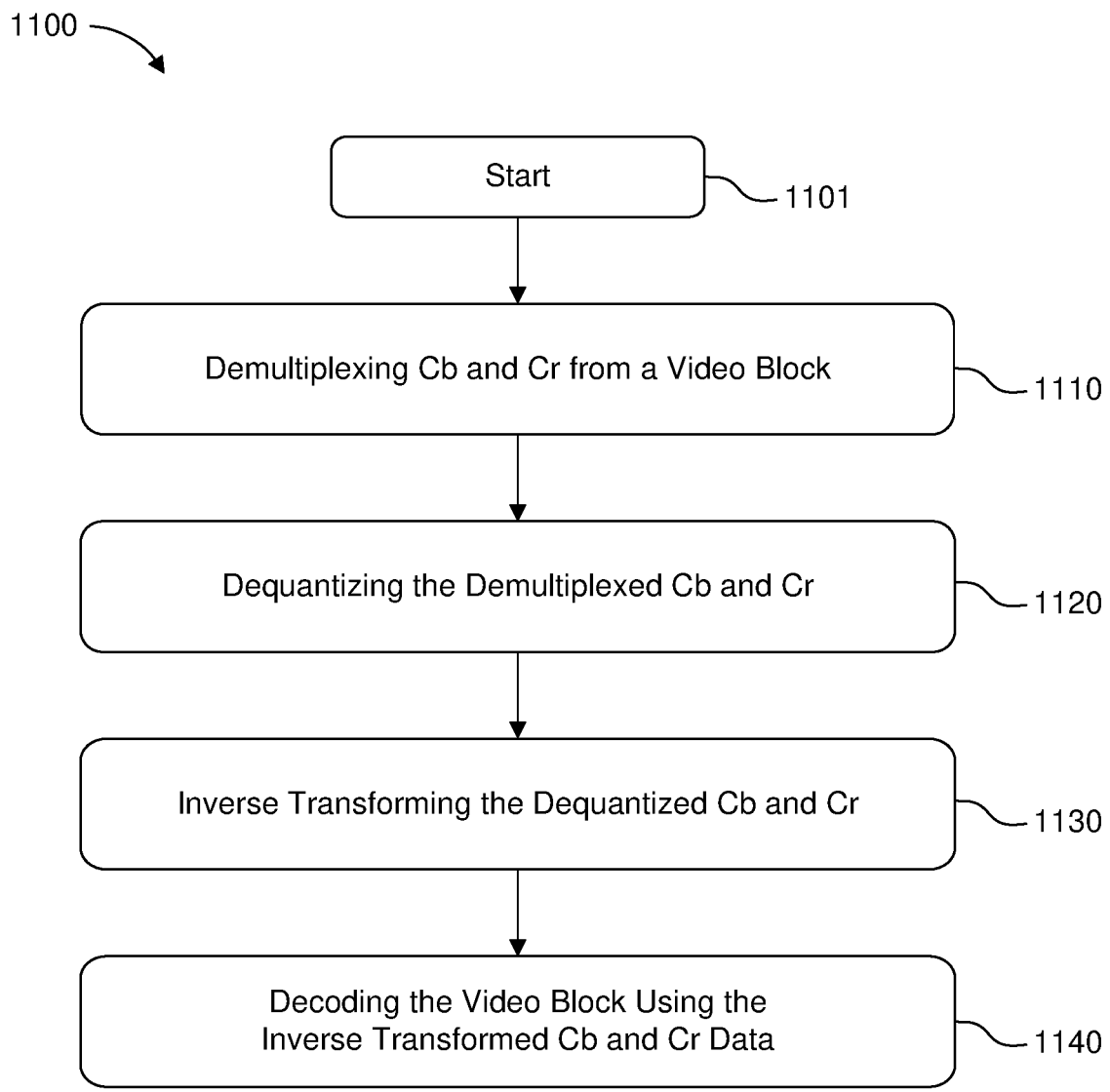
FIG. 11 shows one embodiment of a method under the general described aspects.

One embodiment of a method 1100 under the general aspects described here is shown in FIG. 11. The method commences at start block 1101 and control proceeds to block 1110 for demultiplexing Cb and Cr from a video block when joint Cb/Cr are coded for the video block. Control proceeds from block 1110 to block 1120 for dequantizing the demultiplexed Cb and Cr data. Control proceeds from block 1120 to block 1130 for inverse transforming the dequantized Cb and Cr data. Control proceeds from block 1130 to block 1140 for decoding said video block using said inverse transformed Cb and Cr data.

Figure 12:
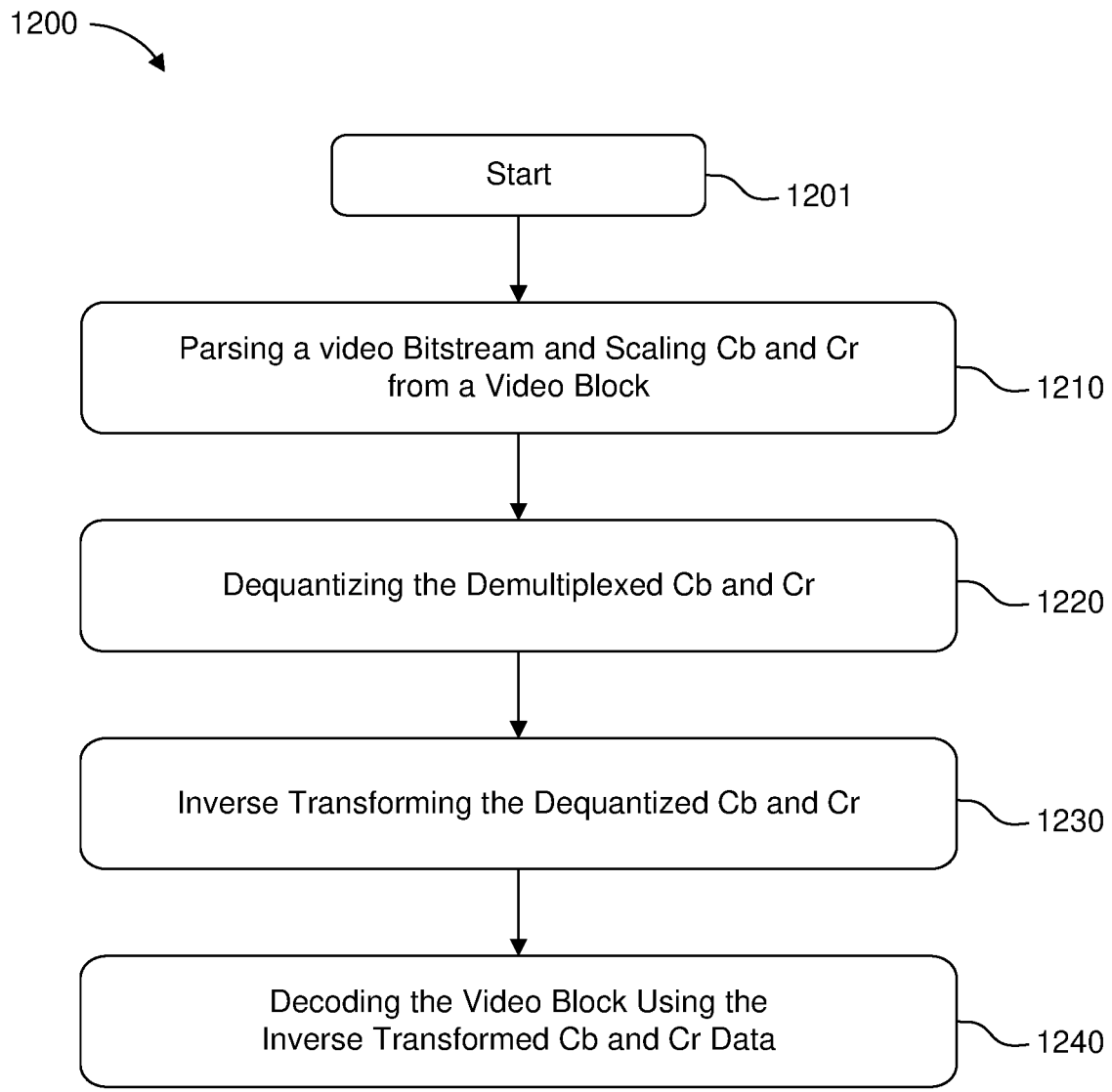
FIG. 12 shows another embodiment of a method under the general described aspects.

One embodiment of a method 1200 under the general aspects described here is shown in FIG. 12. The method commences at start block 1201 and control proceeds to block 1210 for parsing a video bitstream and scaling Cb and Cr from a video block. Control proceeds from block 1210 to block 1220 for dequantizing the demultiplexed Cb and Cr data. Control proceeds from block 1220 to block 1230 for inverse transforming the dequantized Cb and Cr data. Control proceeds from block 1230 to block 1240 for decoding said video block using said inverse transformed Cb and Cr data.

Figure 13:
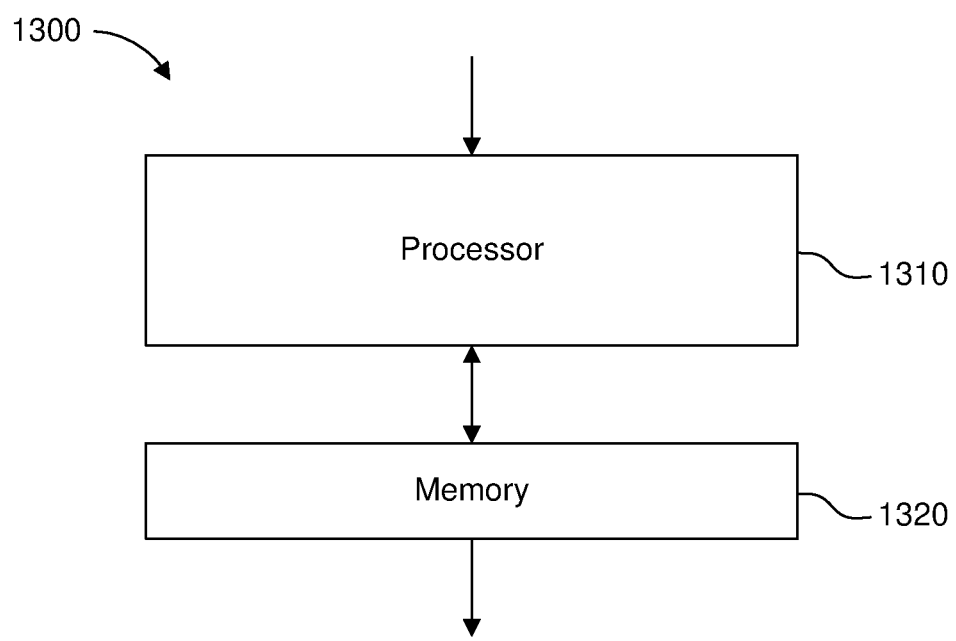
FIG. 13 shows an example apparatus under the described aspects.

FIG. 13 shows one embodiment of an apparatus 1300 for encoding, decoding, compressing or decompressing video data using simplifications of coding modes based on neighboring samples dependent parametric models. The apparatus comprises Processor 1310 and can be interconnected to a memory 1320 through at least one port. Both Processor 1310 and memory 1320 can also have one or more additional interconnections to external connections.

Processor 1310 is also configured to either insert or receive information in a bitstream and, either compressing, encoding or decoding using any of the described aspects.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 10:
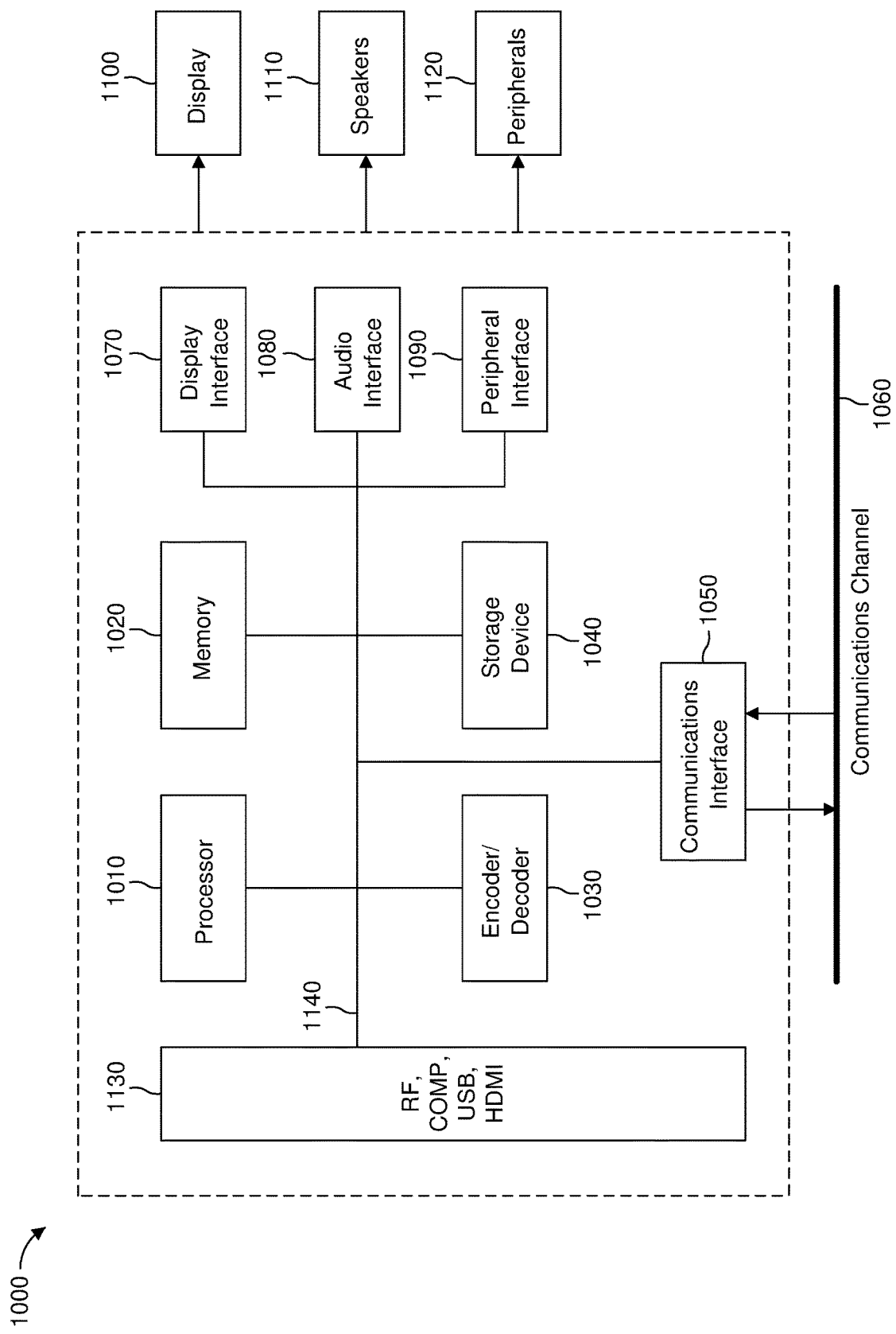
FIG. 10 shows a processor based system for encoding/decoding under the general described aspects.

The aspects described and contemplated in this application can be implemented in many different forms. FIGS. 1, 2 and 10 provide some embodiments, but other embodiments are contemplated and the discussion of FIGS. 1, 2 and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 10 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to process jointly coded Cb and Cr signals.

A process or device to encode jointly coded Cb and Cr signals.

A process or device comprising syntax or semantics that operate with jointly coded Cb and Cr signals.

Using or inserting syntax in the bitstream to control jointly coded Cb and Cr signals in an encoder or a decoder.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine tools in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
   demultiplexing Cb and Cr from a video block when joint Cb/Cr are coded for the video block;
   dequantizing the demultiplexed Cb and Cr data;
   inverse transforming the dequantized Cb and Cr data; and,
   decoding said video block using said inverse transformed Cb and Cr data.

2. An apparatus, comprising:
   a processor, configured to:
   demultiplex Cb and Cr from a video block when joint Cb/Cr are coded for the video block;
   dequantize the demultiplexed Cb and Cr data;
   inverse transform the dequantized Cb and Cr data; and,
   decode said video block using said inverse transformed Cb and Cr data.

3. A device comprising:
   an apparatus according to claim 2; and
   at least one of (i) an antenna configured to receive a signal, the signal including the video block, (ii) a band limiter configured to limit the received signal to a band of frequencies that includes the video block, and (iii) a display configured to display an output representative of a video block.

4. The method of claim 1, wherein specific quantization control parameters are specified.

5. The method of claim 1, wherein separate Cb and Cr offsets are specified for joint chroma coded blocks.

6. The method of claim 1, wherein quantization control parameters specific to joint chroma coded blocks are used for both Cb and Cr channels instead of nominal chroma quantization parameters.

7. A non-transitory computer readable medium containing data content generated according to the method of claim 1, for playback using a processor.

8. A computer program product comprising video data generated according to the method of claim 1, for playback using a processor.

9. A computer program product comprising instructions which, when the program is executed by a computer, cause the computer to carry out the method of claim 1.

10. The apparatus of claim 2, wherein specific quantization control parameters are specified.

11. The apparatus of claim 2, wherein separate Cb and Cr offsets are specified for joint chroma coded blocks.

12. The apparatus of claim 2, wherein quantization control parameters specific to joint chroma coded blocks are used for both Cb and Cr channels instead of nominal chroma quantization parameters.

13. A non-transitory computer readable medium containing data content generated according to the apparatus of claim 2; for playback using a processor.

14. A computer program product comprising video data generated according to the apparatus of claim 2, for playback using a processor.

* * * * *